United States Patent [19]
Guerrette

[11] Patent Number: 6,085,693
[45] Date of Patent: Jul. 11, 2000

[54] WILD ANIMAL FEED DISPENSING DEVICE

[76] Inventor: Theodore A. Guerrette, 2064 West St., Southington, Conn. 06489

[21] Appl. No.: 09/307,571

[22] Filed: May 7, 1999

[51] Int. Cl.$^7$ ...................................................... A01K 5/00
[52] U.S. Cl. .......................................................... 119/51.03
[58] Field of Search ............................. 119/51.03, 51.01, 119/52.2, 57.8, 464, 465, 475

[56] References Cited

U.S. PATENT DOCUMENTS

| | | | |
|---|---|---|---|
| D. 119,499 | 3/1940 | Howard | 119/51.03 |
| 3,306,260 | 2/1967 | Ciampi | 119/51.03 |
| 3,537,429 | 11/1970 | Regan | 119/51.03 |
| 3,638,617 | 2/1972 | White | 119/51.03 |
| 4,632,062 | 12/1986 | Hubbard | 119/51.03 |
| 5,076,214 | 12/1991 | Petit | 119/51.03 |
| 5,664,522 | 9/1997 | Keller | 119/51.03 |
| 5,755,178 | 5/1998 | Lush | 119/51.03 |

*Primary Examiner*—Peter M. Poon
*Assistant Examiner*—Elizabeth Shaw
*Attorney, Agent, or Firm*—McCormick, Paulding & Huber LLP

[57] ABSTRACT

A squirrel feeder comprising a thin planar disc having a plurality of individual openings spaced circumaxially thereabout for receiving peanuts, acorns etc. An elongated tube mounts the disc substantially centrally at its free end portion and with its opposite end portion attached to a supporting structure. A rotary connection may be provided between the mounting tube and disc particularly when the disc resides in a vertical plane with the tube extending horizontally. With the disc in a horizontal plane atop a mounting tube which extends vertically and with a spring connection between the tube and the disc, a rotational connection may also be added for complex "wobble" and rotational movement of the disc.

16 Claims, 3 Drawing Sheets

WILD ANIMAL FEED DISPENSING DEVICE

FIELD OF THE INVENTION

The present invention relates generally to a wild animal feed dispensing device specifically designed for feeding squirrels and also for the amusement and entertainment of observers.

BACKGROUND OF THE INVENTION

As is well known, bird feeders take a wide variety in design and not only feed the birds in the winter months when snow cover might otherwise prevent them from finding food, but they also provide considerable enjoyment to individuals who observe the birds as they come to feed. Certain feeders are specifically designed to prevent squirrels and other wild animals from gaining access to the feed. On the other hand, few if any feeders have been specifically designed for squirrels, and in general squirrels have been left to their own resources in snow covered regions as well as other areas.

It is a general object of the present invention to provide a wild animal feed dispensing device particularly adapted for squirrels and which also provides visual entertainment to observers resulting from the amazing agility and acrobatic skills of the squirrels as they feed.

SUMMARY OF THE INVENTION

In fulfillment of the foregoing object and in accordance with the present invention, a wild animal feed dispensing device is provided with a thin planar feed storage and dispensing member having a plurality of individual food carriers disposed in spaced apart relationship thereabout. The food is releasably held by each carrier so as to be removed by the squirrel.. An elongated mounting member is connected at a free end portion with the feed dispensing member and supports the same. The opposite end of the mounting member has attachment means for fixing the same in position with its free end remote from said opposite end portion. A connection between the free end portion of the mounting member and the dispensing member provides for movement of the latter in an unconstrained pattern of movement as a squirrel moves about indiscriminately on the member in removing food therefrom.

More particularly, the dispensing device and mounting member may be connected for free rotation of the former relative to the latter on movement of the feeding animal on the dispensing member. Alternatively, a flexible connection may be provided for between the mounting and dispensing members such that the movement of the latter occurs in an unpredictable complex pattern in at least two directions. Finally, the mounting and dispensing members may be so connected together as to provide for both rotation and flexible movement of the dispensing member.

Still further, the feed dispensing device may be adapted for both vertical and horizontal operation wherein a mounting member extends substantially horizontally with a feed dispensing member disposed substantially in a vertical plane or, alternatively, the mounting member may be arranged vertically with a feed dispensing member arranged substantially in a horizontal plane.

DESCRIPTION OF THE PREFERRED EMBODIMENTS

Figure 1:
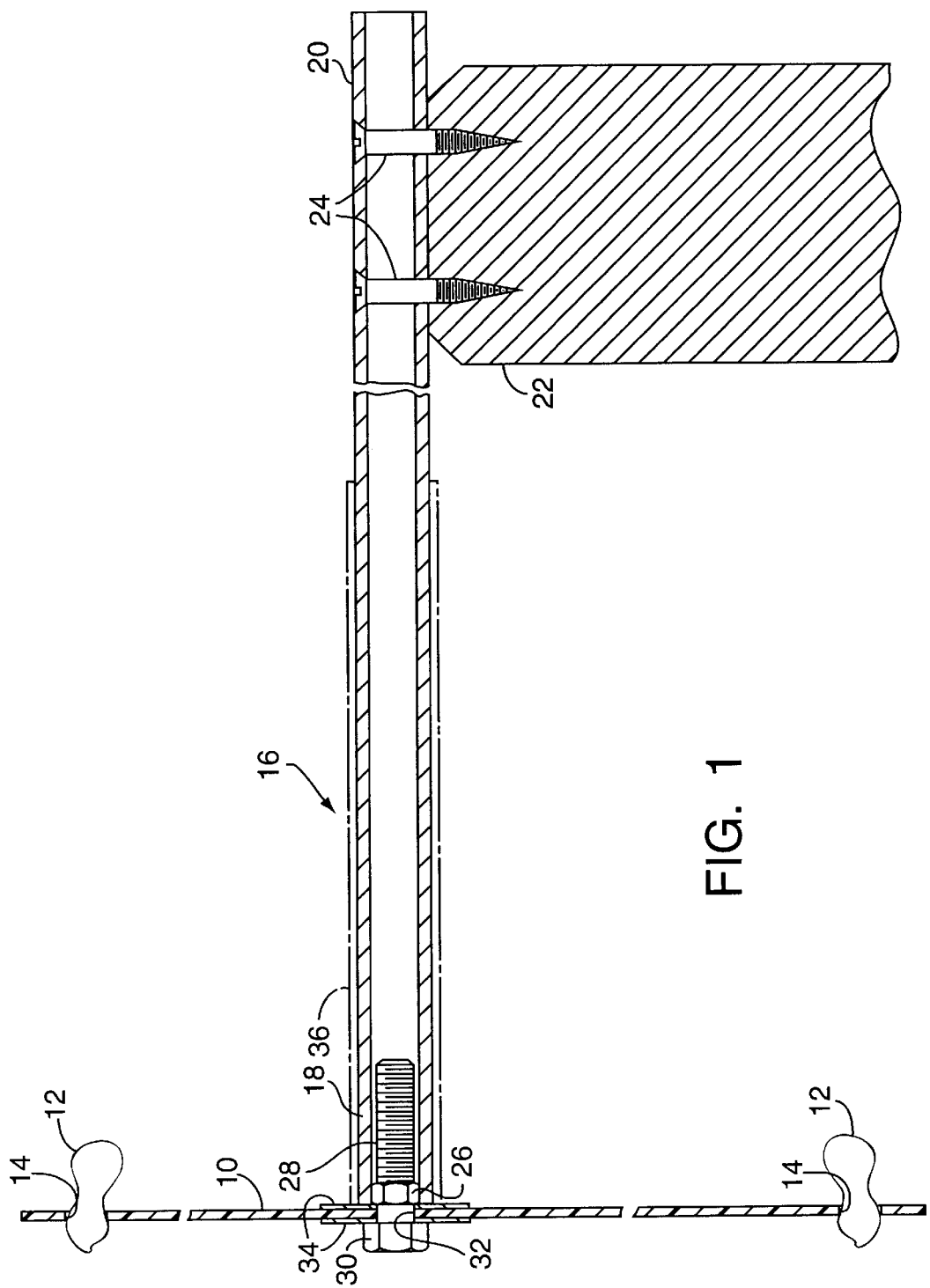
FIG. 1 is sectional view of a feed dispensing device of the present invention wherein the mounting member is arranged horizontally and the feed dispensing member substantially vertically.
Figure 3:
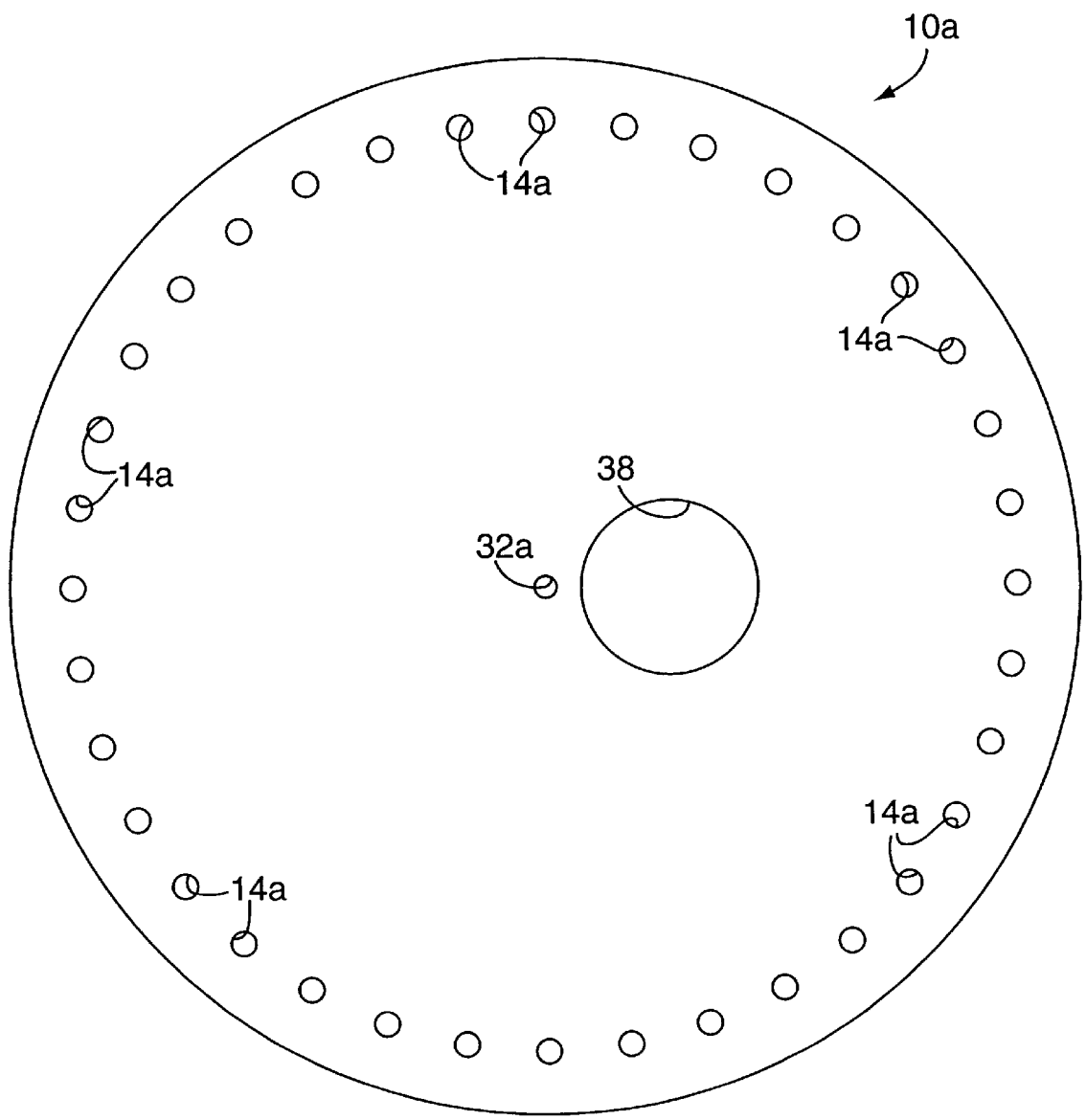
FIG. 3 is a plan view of a feed dispensing member in accordance with the present invention.

Referring particularly to FIG. 1, it will be observed that a feed dispensing member 10 is disposed in a substantially vertical plane and carries peanuts 12, 12 in through openings 14, 14 provided therein. The member 10 preferably takes the form of a thin planar disc as shown in FIG. 3 with a plurality of circumaxially arranged openings 14, 14 for receiving peanuts, acorns and other food favored by squirrels.

A mounting member or tube indicated generally at 16 takes an elongated form with a free end portion 18 and a supporting and attached end portion 20. The end portion 20 is shown mounted for horizontal projection of the member or tube 16 on a top portion of a post 22, which may be a part of a deck, a pair of mounting screws 24, 24 being provided for attachment. A nut 26 fixed in the free end portion of the tube 16 receives a bolt shank 28 which projects from the free end portion of the tube and has a head 30 at its free end portion. The shank of the bolt 28 is loosely and rotatably received in a central opening 32 in the disc 10, FIG. 3. A pair of washers 34, 34 respectively reside on opposite sides of the disc 10 in an embracing relationship therewith and the disc is freely rotatable therebetween about the shank of the bolt 28. Preferably, a second tube 36 is provided and is arranged in rotatable telescopic relationship about the tube 16 with its left hand end portion covering the bolt 28 and engaging the right hand washer 34.

When a squirrel attempts to remove peanuts from the disc 10, obviously, first the tube 36 and then the disc will rotate freely under the weight of the squirrel and may assume an arcuate back and forth pattern of movement or the disc may actually turn through approximately 180° (one hundred eighty degrees) with the squirrel depending from the disc in his attempt to remove food from the openings or carriers 14, 14. Anyone who has been amazed at the agility and acrobatic ability of squirrels will recognize immediately that an observer will be entertained and amused endlessly by the continuing efforts and antics of a squirrel in removing food from the feed dispensing member.

Figure 2:
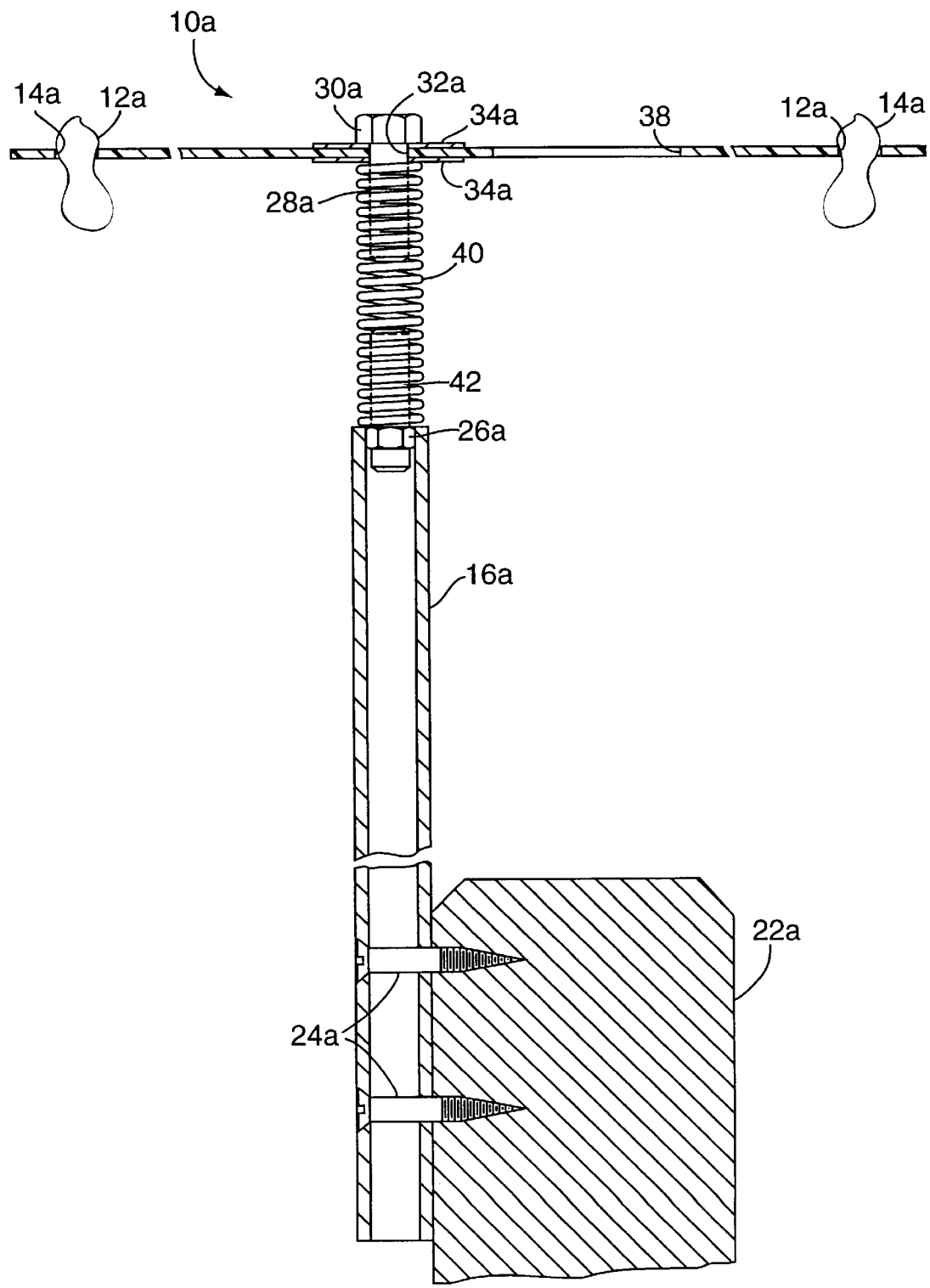
FIG. 2 is a sectional view of a second embodiment of the feed dispensing device wherein the mounting member is substantially vertical and the feed dispensing member is substantially horizontal.

In FIG. 2, a disc 10a is substantially identical with the disc 10 except for the provision of an access opening 38 for a purpose to be described hereinbelow. The disc 10a is arranged substantially in a horizontal plane as shown in FIG. 2 and has carriers or food openings 14a, 14a shown with peanuts disposed therein. At a central opening 32a the disc 10a is attached to and supported by a bolt 28a which may be substantially identical with the aforementioned bolt 28 and which has a head 30a. Opposite the head 30a and disposed about the bolt 28a is an upper end portion of a coil spring 40 which extends downwardly to a bolt 42 secured in the free end portion of a mounting tube 16a by means of a nut 26a. At a lower end portion the mounting member or tube 16a, is secured to a deck post 22a by means of screws 24a.

The fit of the shanks of the bolts 28a and 42 within the coil spring 40 is sufficiently tight to provide for integrity of the assembly and to withstand flexing of the coil spring particularly at the central portion thereof between the two bolt shanks. Such flexing will of course occur when a squirrel mounts the disc 10a and moves about in an attempt to remove the peanuts 12a, 12a from the openings 14a, 14a. Obviously, a "wobble" pattern of movement may occur as the squirrel moves from side to side or circularly about the disc 10a. In addition, the opening 32a may be of such size as to provide for free rotation of the disc 10a. Thus, a "wobble" pattern of movement may be combined with rotational movement making it even more difficult for the squirrel to remove the peanuts 12a, 12a from the openings 14a, 14a.

The purpose of the aforementioned access opening 38 will now become apparent. A squirrel climbing the mounting member or tube 16a can readily enter the access opening 38 in order to attain the top surface of the disc 10a.

As will be apparent from the foregoing, the squirrel feeding device of the present invention is of desirably simple construction and yet functions efficiently in providing a feeding function for squirrels as well as amusement and entertainment for individuals observing the squirrels.

I claim:

1. A wild animal feed dispensing device comprising:
   a. a thin planar feed storage and dispensing member having a plurality of individual food carriers in the form of openings in said dispensing member disposed in spaced apart relationship thereabout, the food being releasably held by each opening so as to be removed by the wild animal;
   b. an elongated mounting member which at a free end portion is connected to and supports said feed dispensing member, the opposite end portion of said mounting member having attachment means for fixing the same in position with its free end portion remote from said opposite end portion; and
   c. a connection between said free end portion and said dispensing member providing for movement of the latter at the slightest urging in an unconstrained pattern of movement as a wild animal moves about indiscriminately on the member in removing food therefrom.

2. A wild animal feed dispensing device as set forth in claim 1 wherein said connection between said dispensing and mounting members provides for free rotation of the former relative to the latter on movement of the feeding animal on the dispensing member.

3. A wild animal feed dispensing device as set forth in claim 1 wherein the connection between the mounting member and the dispensing member is flexible and provides for movement of the latter in an unpredictable complex pattern in at least two directions.

4. A wild animal feed dispensing device as set forth in claim 1 wherein the dispensing member and mounting member respectively reside in substantially vertical and horizontal planes.

5. A wild animal feed dispensing device as set forth in claim 1 wherein said dispensing member takes the form of a thin circular disc rotatably supported substantially at its center on a free end portion of the associated mounting member.

6. A wild animal feed dispensing device as set forth in claim 5 wherein the mounting member takes the form of an elongated first tube having a bolt fixed in its free end and projecting therefrom, and wherein the dispensing disc has a central opening which loosely receives the projecting bolt for rotation thereabout.

7. A wild animal feed dispensing device as set forth in claim 1 wherein the dispensing member and the mounting member respectively reside in substantially horizontal and vertical planes.

8. A wild animal feed dispensing device as set forth in claim 1 wherein said mounting member includes a spring which provides for the aforesaid unpredictable complex pattern of movement when a small wild animal such as a squirrel moves about on the member.

9. A wild animal feed dispensing device as set forth in claim 8 wherein said dispensing member takes the form of a thin circular disc flexibly supported at its center on a free end portion of the associated mounting member.

10. A wild animal feed dispensing device comprising:
    a. a thin planar feed storage and a substantially vertical dispensing member in the form of a thin circular disc having a plurality of individual food carriers in the form of openings in said dispensing member disposed in spaced apart relationship thereabout, the food being releasably held by each opening so as to be removed by the wild animal;
    b. an elongated, substantially horizontal tubular mounting member which at a free end portion is connected to and rotatably supports said feed dispensing disk, the opposite end portion of said mounting member having attachment means for fixing the same in position with its free end portion remote from said opposite end portion; and
    c. a connection between said free end portion and said dispensing member providing for movement of the latter at the slightest urging in an unconstrained pattern of movement as a wild animal moves about indiscriminately on the member in removing food therefrom, wherein a pair of washers are provided respectively on opposite sides of the disc and a second tube is mounted telescopically on said one tube and covers the projecting bolt with its free end engaging one of said washers.

11. A wild animal feed dispensing device as set forth in claim 10 wherein said connection between said dispensing and mounting tube provides for free rotation of the former relative to the latter on movement of the feeding animal on the dispensing member.

12. A wild animal feed dispensing device as set forth in claim 10 wherein the connection between the mounting member and the dispensing member is flexible and provides for movement of the latter in an unpredictable complex pattern in at least two directions.

13. A wild animal feed dispensing device comprising:
    a. a thin planar feed storage and dispensing member having a plurality of individual food carriers disposed in spaced apart relationship thereabout, the food being releasably held by each opening so as to be removed by the wild animal; said dispensing member taking the form of a thin circular disc flexibly supported at its center on a free end portion of the associated mounting member;
    b. an elongated tubular mounting member which at a free end portion is connected to and supports said feed dispensing disc, the opposite end portion of said mounting member having attachment means for fixing the same in position with its free end portion remote from said opposite end portion; the connection between the mounting member and the dispensing member being flexible and providing for movement of the latter in an unpredictable complex pattern in at least two directions; and
    c. a connection between said free end portion and said dispensing disc providing for movement of the latter at the slightest urging in an unconstrained pattern of movement as a wild animal moves about indiscriminately on the member in removing food therefrom, a coil spring attached at an upper and free end portion of said tubular member and projecting upwardly therefrom, and said coil spring being attached to the dispensing disc substantially at its center to provide the unpredictable pattern of movement as foresaid.

14. A wild animal feed dispensing device as set forth in claim 13 wherein said connection between said dispensing and mounting members provides for free rotation of the former relative to the latter on movement of the feeding animal on the dispensing member.

15. A wild animal feed dispensing device as set forth in claim 13 wherein the dispensing disc is provided with a small access opening for the upward passage of a small wild animal such as a squirrel.

16. A wild animal feed dispensing device comprising:
   a. a thin planar feed storage and dispensing member having a plurality of individual food carriers disposed in spaced apart relationship thereabout, the food being releasably held by each opening so as to be removed by the wild animal; said dispensing member taking the form of a thin circular disc flexibly supported at its center on a free end portion of the associated mounting member.
   b. an elongated tubular mounting member which at a free end portion is connected to and supports said feed dispensing disc, the opposite end portion of said mounting member having attachment means for fixing the same in position with its free end portion remote from said opposite end portion; the connection between the mounting member and the dispensing member being flexible and providing for movement of the latter in an unpredictable complex pattern in at least two directions; and
   c. a connection between said free end portion and said dispensing disc providing for movement of the latter at the slightest urging in an unconstrained pattern of movement as a wild animal moves about indiscriminately on the member in removing food therefrom, a coil spring attached at an upper and free end portion of said tubular member and projecting upwardly therefrom, and said coil spring being attached to the dispensing disc substantially at its center to provide the unpredictable pattern of movement as foresaid, wherein the dispensing disc is provided with a small access opening for the upward passage of a small wild animal such as a squirrel.

\* \* \* \* \*